(12) United States Patent
Tsuda et al.

(10) Patent No.: US 11,076,329 B2
(45) Date of Patent: Jul. 27, 2021

(54) INFRASTRUCTURE EQUIPMENT PROVIDING TERRESTRIAL COVERAGE TO TERRESTRIAL ELECTRONIC DEVICES AND AERIAL COVERAGE TO AERIAL ELECTRONIC DEVICES

(71) Applicant: Sony Corporation, Tokyo (JP)

(72) Inventors: Shinichiro Tsuda, Basingstoke (GB); Hideji Wakabayashi, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/643,591

(22) PCT Filed: Jul. 26, 2018

(86) PCT No.: PCT/EP2018/070357
§ 371 (c)(1),
(2) Date: Mar. 2, 2020

(87) PCT Pub. No.: WO2019/048127
PCT Pub. Date: Mar. 14, 2019

(65) Prior Publication Data
US 2020/0245208 A1    Jul. 30, 2020

(30) Foreign Application Priority Data

Sep. 7, 2017  (EP) .................................. 17189880

(51) Int. Cl.
*H04W 36/08* (2009.01)
*H04W 76/27* (2018.01)
*H04B 7/06* (2006.01)
*H04L 5/00* (2006.01)
*H04W 36/30* (2009.01)
*H04W 16/28* (2009.01)
*H04W 24/10* (2009.01)

(52) U.S. Cl.
CPC .......... *H04W 36/08* (2013.01); *H04B 7/0617* (2013.01); *H04L 5/0048* (2013.01); *H04W 16/28* (2013.01); *H04W 24/10* (2013.01); *H04W 36/30* (2013.01); *H04W 76/27* (2018.02)

(58) Field of Classification Search
CPC ..... H04W 36/08; H04W 36/30; H04W 76/27; H04W 16/28; H04W 24/10; H04B 7/0617; H04L 5/0048
USPC ....................................... 455/436
See application file for complete search history.

(56) References Cited

U.S. PATENT DOCUMENTS

2014/0192768 A1* 7/2014 Yeh ............... H04B 7/0478
                                               370/330
2018/0288630 A1* 10/2018 Guirguis ............ H04W 24/10
2018/0324662 A1* 11/2018 Phuyal ............... H04W 48/18
2020/0077321 A1* 3/2020 Shi ................. H04W 28/0215
(Continued)

OTHER PUBLICATIONS

WG2 Meeting #98, R2-1704997 May 2017.*
(Continued)

*Primary Examiner* — William Nealon
(74) *Attorney, Agent, or Firm* — Xsensus LLP

(57) ABSTRACT

Infrastructure equipment comprising circuitry configured to provide a terrestrial cell coverage to a terrestrial UE and an aerial cell coverage to an aerial UE, the aerial cell coverage being provided in a tracking manner in relation to a mobility of the aerial UE.

18 Claims, 10 Drawing Sheets

(56) References Cited

U.S. PATENT DOCUMENTS

2020/0187151 A1* 6/2020 Wang ............... H04W 64/006
2020/0252941 A1* 8/2020 Schmidt ............ H04W 36/16

OTHER PUBLICATIONS

WG2 Meeting #98, R2-1704333 May 2017.*
WG2 Meeting #98, R2-1705000 May 2017.*
WG2 Meeting #99, R2-1704335 Aug. 2017.*
WG2 Meeting #98 R2-1705427 May 2017.*
3GPP WG1 Meeting #90 R1-1712103 Aug. 2017.*
International Search Report and Written Opinion dated Sep. 19, 2018 for PCT/EP2018/070357 filed on Jul. 26, 2018, 14 pages.
Lee, E., et al., "Intelligent Handover Scheme for Drone Using Fuzzy Inference Systems," IEEE Access, vol. 5, Jul. 11, 2017, pp. 1-7.
Ericsson, "Potential enhancements for HO," 3GPP TSG-RAN WG2 Meeting No. 98, R2-1705427, Hangzhou, China, May 15-19, 2017, pp. 1-3.
Ericsson, "Potential enhancements for UAV interference problem," 3GPP TSG-RAN WG2 Meeting No. 98, R2-1705426, Hangzhou, China, May 15-19, 2017, pp. 1-3.
Huawei and Hisilicon, "Identification of air-borne drones," 3GPP TSG-RAN WG2 Meeting No. 98, R2-1705000, Hangzhou, China, May 15-19, 2017, 3 pages.
Huawei and Hisilicon, "Identification of Air-borne UE," 3GPP TSG-RAN WG2 Meeting No. 99, R2-1708543, Berlin, Germany, Aug. 21-25, 2017, 3 pages.
Huawei and Hisilicon, "Mobility enhancement for Drones," 3GPP TSG-RAN WG2 Meeting No. 98, R2-1704997, Hangzhou, China, May 15-19, 2017, 6 pages.
Nokia and Alcatel-Lucent Shanghai Bell, "Potential mobility issues for air-borne UEs," 3GPP TSG-RAN WG2 Meeting No. 98, R2-1704321, Hangzhou, China, May 15-19, 2017, 4 pages.
NTT Docomo, Inc., "Aerial Vehicle UE identification," 3GPP TSG-RAN2 No. 98, R2-1704335, Hangzhou, P.R. China, Apr. 15-19, 2017, pp. 1-2.
NTT Docomo, Inc., "Initial views on potential problems and solutions for aerial vehicles," 3GPP TSG RAN WG2, No. 98, R2-1704333, Hangzhou, P.R. China, May 15-19, 2017, 5 pages.
Qualcomm Incorporated, "Handover results for aerial vehicles," 3GPP TSG-RAN WG2 Meeting No. 98, R2-1704155, Hangzhou, China, May 15-19, 2017, 6 pages.
Qualcomm, "LTE Unmanned Aircraft Systems," Trial Report, version v1.0.1, May 12, 2017, pp. 1-65.
Sony, "Interference mitigation techniques for aerial vehicles," 3GPP TSG-RAN WG1 No. 90, R1-1714055, Prague, Czech Republic, Aug. 21-25, 2017, 2 pages.

* cited by examiner

INFRASTRUCTURE EQUIPMENT PROVIDING TERRESTRIAL COVERAGE TO TERRESTRIAL ELECTRONIC DEVICES AND AERIAL COVERAGE TO AERIAL ELECTRONIC DEVICES

CROSS-REFERENCE TO RELATED APPLICATIONS

The present application is based on PCT filing PCT/EP2018/070357, filed Jul. 26, 2018, which claims priority to EP 17189880.2, filed Sep. 7, 2017, the entire contents of each are incorporated herein by reference.

TECHNICAL FIELD

The present disclosure generally pertains to entities and user equipment of a mobile telecommunications system.

TECHNICAL BACKGROUND

Several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

A candidate for providing the requirements of 5G is the so called Long Term Evolution ("LTE"), which is a wireless communication technology allowing high-speed data communications for mobile phones and data terminals and which is already used for 4G mobile telecommunications systems. Other candidates for meeting the 5G requirements are termed New Radio Access Technology Systems (NR). An NR can be based on LTE technology, just as LTE was based on previous generations of mobile communications technology.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation "3G") network technologies.

LTE is standardized under the control of 3GPP ("3rd Generation Partnership Project"). There exists a successor LTE-A (LTE Advanced) allowing higher data rates as the basis LTE which is also standardized under the control of 3GPP.

For the future, 3GPP plans to further develop LTE-A, such that it will be able to fulfill the technical requirements of 5G. As the 5G system will be based on LTE or LTE-A, respectively, it is assumed that specific requirements of the 5G technologies will, basically, be dealt with by features and methods which are already defined in the LTE and LTE-A standard documentation.

Current technical areas of interest to those working in the field of wireless and mobile communications are known as the "Internet of Things", or IoT for short, and "Machine to Machine Communication" (M2M), or Machine Type Communication (MTC). The 3GPP has proposed to develop technologies for supporting narrow band (NB)-IoT using an LTE or 4G wireless access interface and wireless infrastructure. Such IoT devices are expected to be low complexity and inexpensive devices requiring infrequent communication of relatively low bandwidth data. It is also expected that there will be an extremely large number of IoT devices which would need to be supported in a cell of the wireless communications network.

Unmanned Aerial Vehicles (UAV), more commonly referred to as "Drones", are aircrafts that operate with various degrees of autonomy, e.g. under remote control by a human operator or autonomously by onboard micro controller. The remote control of drones may be based on a usage of cellular networks in a regulatory manner. Consequently, a support of cellular communication could be foreseen for drones. A drone may carry a legal UE, which is certified for aerial usage, or, alternatively, a drone may carry a UE that is only certified for terrestrial operation, e.g. a smart phone.

R2-1704321 [1] describes a set of measurements that were performed in order to understand the effects of UEs being elevated from the ground. According to the measurements, the average number of detectable cells and range of detected cells per height changes depending on the height of the drone.

R2-1704155 [2] describes as an observation that aerial UEs experience less handovers than ground UEs and aerial UEs experience less radio link failures than ground UEs.

R2-1704333 [3] points out that an increasing number of visible cells should cause significant interference with communications between eNBs and terrestrial UEs.

R2-1705427 [4] describes investigations of the ability for aerial vehicles to be served using LTE network deployments with base station antennas targeting terrestrial coverage, supporting Release 14 functionality (i.e. including active antennas and FD-MIMO), to verify the level of performance in terms of latency, reliability, delay jitter, coverage, data rate, and UE density, positioning accuracy, etc.

These studies show that an efficient mobility management for aerial UEs mitigating interference with terrestrial UEs is needed.

SUMMARY

According to a first aspect the disclosure provides an infrastructure equipment comprising circuitry configured to provide a terrestrial cell coverage to a terrestrial UE and an aerial cell coverage to an aerial UE, the aerial cell coverage being provided in a tracking manner in relation to a mobility of the aerial UE.

According to a further aspect the disclosure provides an electronic device comprising circuitry, wherein the circuitry is configured to receive an aerial cell coverage from an eNB in a tracking manner in relation to a mobility of the electronic device.

According to a further aspect the disclosure provides a method comprising providing a terrestrial cell coverage to a terrestrial UE and an aerial cell coverage to an aerial UE, the aerial cell coverage being provided in a tracking manner in relation to a mobility of the aerial UE.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
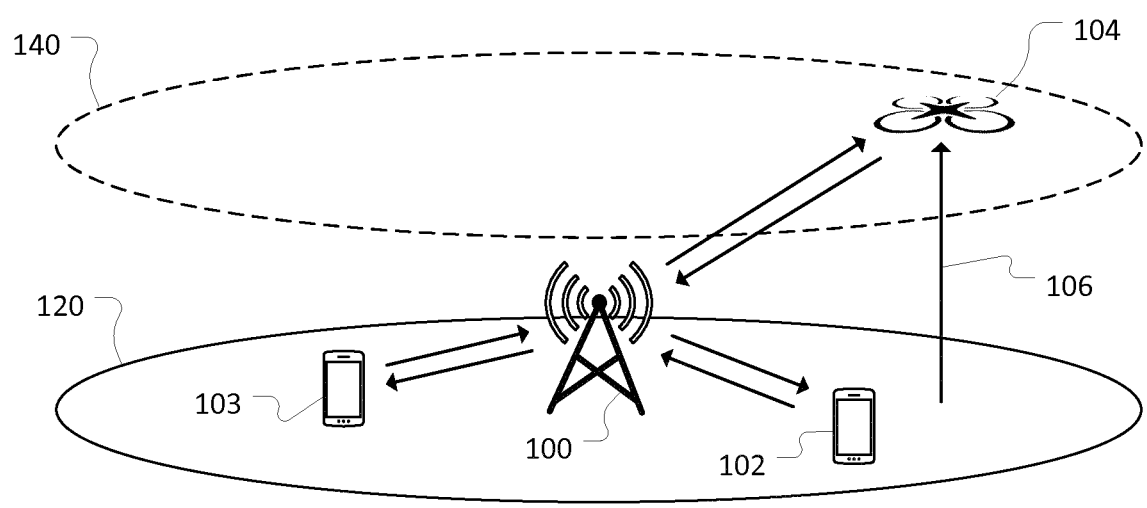
FIG. 1 discloses an embodiment in which an eNB that is designed based on currently deployed base stations for cellular systems builds a different type of cell coverage ("areal cell coverage") for aerial UEs in addition to the normal cell coverage for terrestrial UEs.

The embodiments disclose an infrastructure equipment comprising circuitry configured to provide a terrestrial cell coverage to a terrestrial UE and an aerial cell coverage to an aerial UE (or one or more aerial UEs), the aerial cell coverage being provided in a tracking manner in relation to a mobility of the aerial UE. Even though, for simplicity of the description, it is in the following referred to one terrestrial UE and one aerial UE, the circuitry is generally configured to provide a terrestrial cell coverage to one or more terrestrial UEs and to provide an aerial cell coverage to one or more aerial UEs.

The infrastructure equipment may also be referred to as a base station, network element, enhanced Node B (eNodeB, or eNB) or a coordinating entity for example, and may provide a wireless access interface to one or more communications devices within a coverage area or cell. The infrastructure equipment may for example be any entity of a telecommunications system, e.g. an entity of a New Radio Access Technology Systems.

A User Equipment (UE) may be any device that is related to an end-user or to a terminal to communicate in e.g. a Universal Mobile Telecommunications System (UMTS) and 3GPP Long Term Evolution (LTE, or aLTE) system.

An aerial UE may for example be an UE that is provided in, on or at an aerial vehicle. An aerial device may for example be an Unmanned Aerial Vehicles (UAV) (a "Drone"), or aircrafts that operate with various degrees of autonomy, e.g. under remote control by a human operator or autonomously by an onboard micro controller. An aerial UE may be a mobile communications device that is configured to communicate data via the transmission and reception of signals representing data using a wireless access interface. In the context of this application, the term aerial UE is also used for an electronic device that is autonomously or semi-autonomously operating in an aerial device, without the operator (or "user") of the device being required to be located at or close to the device. The term User Equipment (UE) thus also relates to equipment where the user is located remote to the equipment.

Circuitry of an infrastructure equipment may include at least one of: a processor, a microprocessor, a dedicated circuit, a memory, a storage, a radio interface, a wireless interface, a network interface, or the like, e.g. typical electronic components which are included in a base station, such as an eNodeB.

According to some embodiments, the circuitry of the infrastructure equipment is configured to transmit any signals for control and communication in a tracking manner in relation to a mobility of the aerial UE. Using a tracking manner to provide the aerial cell coverage may allow for providing a dynamic areal cell coverage to aerial vehicles.

Providing an aerial cell coverage in a tracking manner to an aerial UE may comprise determining the mobility of the aerial UE and providing the aerial cell coverage in dependence of this mobility. The mobility of the aerial UE may for example be defined by location information such as GPS position of the aerial UE, the speed of the aerial UE, and/or the like.

The circuitry may be configured to receive a connection request, the connection request comprising information identifying the sender of the connection request as an aerial UE. In this way, the circuitry may be configured to distinguish an aerial UE from a terrestrial UE by means of information identifying the sender of the connection request as an aerial vehicle.

A connection request received from the aerial UE may trigger the circuitry of the infrastructure equipment to transmit reference signals by beam-forming technology to the aerial UE. For example, the circuitry may be configured to allocate radio resources for downlink reference signals transmitted to the aerial UE and to transmit on further allocated radio resources signals for control and/or communication in a tracking manner to the moving aerial UE using beam-forming techniques.

For example, an RRC Connection Request may trigger an eNB to send an RRC Connection Setup and to start transmitting some reference signals using limited resource blocks (RBs) formed by beam-forming technology such as FD MIMO (Full Dimension MIMO) or the like, taking into account efficient radio resource usage.

For example, the circuitry of the infrastructure equipment may be configured to define a beam-forming directivity by setting weights for multiple antenna. In this way, the aerial cell coverage may be configured spatially above the first cell coverage using the directivity of multiple antenna.

The circuitry of the infrastructure equipment may be configured to transmit reference signals by beam-forming technology to the aerial UE in an UE specific or in an on-demand manner. For example, the circuitry may be configured to transmit periodic reference signals such as CRS for terrestrial UEs, but to not transmit any periodic reference signal for aerial vehicles in static manner. I.e., other than with static cell coverage for terrestrial UEs, an eNB may send the reference signals for an aerial UE on demand and thus does not need to always transmit the reference signals to aerial UEs.

According to some embodiments, the circuitry of the infrastructure equipment is configured to define the directivity of multiple antenna based on a location of an aerial UE.

Still further, the circuitry of the infrastructure equipment may be configured to define the aerial cell coverage depending on an area of the terrestrial cell coverage. For example, the circuitry may be configured to provide to aerial UEs an areal cell coverage that has a similar size as the cell coverage for terrestrial UEs.

A connection request received by the infrastructure equipment from the aerial UE may include mobility information related to an aerial UE. Here, location information related to the aerial UE may for example include latitude, longitude and altitude (or height) and/or speed of the aerial UE measured e.g. via GPS. Such mobility information may allow the infrastructure equipment to determine the location and/or speed of an aerial UE.

The circuitry of the infrastructure equipment may be configured to pass the mobility information on to the network, so that the network may manage an eNB that is the nearest eNB to the aerial UE as the serving cell.

Still further, the circuitry of the infrastructure equipment may for example be configured to adapt the transmission of reference signals to the mobility (e.g. location or speed) of an aerial UE. For example, a periodicity of transmitting the reference signals may depend on the mobility of an aerial UE.

According to some embodiments, the circuitry is configured to establish neighbouring areal cell coverage depending on mobility information related to the aerial UE. For example, the circuitry may be configured to determine a speed of the aerial UE, and to switch to a neighbouring areal cell coverage depending on the speed of the aerial UE. As an example, a threshold for switching from a source eNB to a target eNB may be configured depending on the speed of the aerial UE.

The circuitry of the infrastructure equipment may be configured to receive a measurement report from the aerial UE. For example, the circuitry of the infrastructure equipment may be configured to monitor a link quality/channel condition between an aerial UE and a serving eNB based on such a measurement report. The measurement report may for example be used by the infrastructure equipment to track the anal vehicle.

The circuitry of the infrastructure equipment may be configured to start transmitting reference signals with beamforming depending on a link quality/channel condition between the aerial UE and a serving eNB.

A measurement report may for example include measurement results of neighbouring eNBs reported from the areal UE. For example, the circuitry of the infrastructure equipment may be configured to update the configuration of measurement reporting from an aerial UE so as to include the measurements of neighbouring eNBs as well as the measurements of a serving eNB.

A measurement report may also comprise mobility information related to the aerial UE.

The circuitry of the infrastructure equipment may be configured to judge whether handover to a neighbouring eNB is necessary or not, based on a measurement report received from the aerial UE, e.g. based on signal strength/quality and/or mobility information comprised in a measurement report.

For example, the circuitry may be configured to, in the case that the serving eNB judges that handover is necessary, send a Handover Request to a neighbouring eNB as a target eNB and trigger the handover procedure. Still further, the circuitry may be configured to instruct one or more neighboring base stations to start transmitting downlink reference signals depending on the strength or/and quality (and/or mobility information) in the measurement report from a serving base station. This may enable switching the serving eNB from a current serving eNB to a target eNB in accordance with a timing which strength or/and quality on the uplink reference signals at the target eNB is better than that at the current serving eNB by a first threshold.

The circuitry may be configured to set a second threshold, wherein the previous serving eNB continues to transmit data to the aerial UE as well as the new serving eNB (target eNB), until strength or/and quality on the UL reference signals at the new serving eNB is better than that at the previous serving eNB by the second threshold. Still further, the circuitry may be configured to detect a speed of the aerial UE, and to configure the second threshold depending on the speed of the aerial UE.

The circuitry of the infrastructure equipment may be configured to use the same radio resources for transmitting data to the aerial UE as the previous serving base station when starting to act as target eNB.

The circuitry of the infrastructure equipment may be configured to be selected as a serving cell based on a relative relationship of received signal strength of multiple cells which can receive the UL signals from the aerial vehicle.

Such UL signals may include mobility information and the serving cell may be further selected based on the mobility information.

The circuitry of the infrastructure equipment may be configured to configure a setting for transmission of the UL signals at the aerial UE. This setting may for example include at least transmission power and periodicity. Furthermore, this setting may include any scheduling information about which radio resource can be used and this scheduling may be in persistent or semi-persistent manner.

According to some embodiments, the circuitry of the infrastructure equipment may be configured to tilt a main lobe dynamically for receiving specific radio resources allocated for the UL reference signals from the aerial UE. This dynamic main lobe may for example be provided in addition to a static main lobe provided for terrestrial UEs.

The embodiments disclosed below in more detail also provide an electronic device comprising circuitry, wherein the circuitry is configured to be provided with an aerial cell coverage by an eNB in a tracking manner in relation to a mobility of the electronic device. The electronic device may for example be an aerial UE, i.e. an UE that is located in or at an aerial vehicle such as a drone or the like.

Circuitry of an electronic device (e.g. aerial UE) may include at least one of: a processor, a microprocessor, a dedicated circuit, a memory, a storage, a radio interface, a wireless interface, a network interface, or the like, e.g. typical electronic components which are included in a user equipment.

According to the embodiments described below in more detail, the circuitry is configured to receive the aerial cell coverage in a dynamic way.

The circuitry of the electronic device (e.g. aerial UE) may for example be configured to determine if the electronic device operates as a terrestrial UE or as an aerial UE. For example, the circuitry of the aerial UE may be configured to acquire location information (e.g. GPS coordinates including altitude) and to determine if it is an aerial UE based on the location information. Alternatively, the circuitry may be configured to determine operating conditions of a vehicle in order to determine if it is operating as an aerial UE. Still alternatively, the circuitry may be configured to read device settings or configuration settings in order to determine if it is operating as an aerial UE.

The circuitry of the electronic device (e.g. aerial UE) may be configured to transmit a connection request, the connection request identifying the sender of the connection request as an aerial UE. Such a connection request may for example be transmitted to one or more eNBs. The connection request may for example by an RRC connection request. In alternative embodiments, information identifying the sender of a connection request as an aerial UE may be transmitted together with a connection request or separate from a connection request.

The circuitry of the electronic device (e.g. aerial UE) may be configured to transmit mobility information related to an aerial UE to an eNB. The mobility information may for example be transmitted in or with a connection request. The mobility information may include location information, including height or altitude related to the aerial vehicle. Still further, the mobility information may include a speed of the aerial UE.

The circuitry of the electronic device (e.g. aerial UE) may be configured to transmit a connection request, the connection request being configured to trigger an eNB to transmit reference signals in an on-demand manner.

The circuitry of the electronic device (e.g. aerial UE) may be configured to transmit a connection request, the connection request being configured to trigger an eNB to transmit reference signals to an aerial UE by beam-forming technology. For example, an RRC Connection Request may trigger an eNB to send an RRC Connection Setup and to start transmitting some reference signals using limited resource blocks (RBs) formed by beam-forming technology such as FD MIMO (Full Dimension MIMO) or the like, taking into account efficient radio resource usage.

The circuitry of an electronic device (e.g. aerial UE) may be configured to perform reporting of measurements to a serving eNB. For example, the circuitry may be configured to report measurement and or mobility information from an aerial UE to an eNB. That is, a measurement report may comprise information concerning the location and/or speed of an aerial UE.

A measurement report may also include measurements with respect to at least one neighbouring eNB. Based on the measurement report/mobility information obtained from an aerial UE, a network can monitor a link quality/channel condition between the aerial UE and a serving eNB and start Handover preparation, if appropriate.

The circuitry of the electronic device (e.g. aerial UE) may be configured to transmit UL reference signals to one or more eNBs for enabling a selection of a serving eNB among eNBs which can receive the UL reference signals. This transmission of UL reference signals must not necessarily be done by beamforming, but can instead be performed with a relatively broad directivity.

According to some embodiment, the UL reference signals include location information of an aerial vehicle.

The circuitry of an electronic device (e.g. aerial UE) may be configured to receive a configuration of output power from a serving eNB corresponding to the reported location information. Accordingly, the circuitry of the aerial UE may be configured to transmit control signals and data to a serving eNB with the output power configured by the eNB. For example, the circuitry may be configured to receive a resource allocation information to transmit a reference signals, and to transmit the UL reference signals to the serving eNB and to a plurality of neighbouring eNB with an output power configured by the serving eNB.

The embodiments also describe a method comprising providing a terrestrial cell coverage to a terrestrial UE and an aerial cell coverage to an aerial UE, the aerial cell coverage being provided in a tracking manner in relation to a mobility of the aerial UE. The method may comprise any of the aspects described above with regard to the operation of an infrastructure equipment and with regard to an electronic device of the embodiments. The method may also comprise any of the aspects described below in more detail with regard to the operation of an eNB and/or a network entity, and with regard to an aerial UE of the embodiments.

The technique of the embodiments presents efficient operation for aerial vehicles under cellular systems optimized for terrestrial UEs with small impact on the current deployment. A concept of a dynamic areal cell coverage for aerial vehicles in on demand manner in addition to the static cell coverage for terrestrial UEs is provided.

Areal Cell Coverage

Cellular systems are designed by deploying eNBs so that each cell coverage for terrestrial UEs can be regarded as a unit for mobility management such as handover in connected mode or cell selection/reselection in idle mode. This cell coverage for terrestrial UEs can be treated as static coverage provided by transmission of cell specific reference signal (CRS) or Common Reference Signal.

Areal cell coverage for aerial UEs can be a static coverage similar to that for terrestrial UEs. However, from a perspective of minimization of interference to neighbouring cells and efficient usage of radio resources, areal cell coverage for aerial vehicles can be provided in a dynamic manner.

In the embodiments described below in more detail, the term "areal cell coverage" is used to refer to a second coverage ("aerial cell coverage") that is provided by an eNB to aerial UEs, in addition to a first coverage (or "terrestrial cell coverage") that is provided by the eNB to terrestrial UEs.

FIG. 1 discloses an embodiment in which an eNB 100 that is designed based on currently deployed base stations for cellular systems builds a different type of cell coverage ("aerial cell coverage") for aerial UEs in addition to the normal cell coverage ("terrestrial cell coverage") for terrestrial UEs. In FIG. 1, eNB 100 provides terrestrial UEs 102, 103 with a cell coverage 120 for terrestrial UEs and eNB 100 provides an aerial vehicle 104 comprising an aerial UE with a cell coverage 140 for aerial UEs. This "areal cell coverage" may adapt to the varying size of coverage provided by eNB 100 depending on the height 106 of flying aerial vehicle 104.

As the number of visible cells may depend on the height 106 of aerial vehicle 104, the transmission power from eNB 100 and/or from aerial vehicle 104 may be controlled depending on the height of aerial vehicle 104. For example, the transmission power from eNB 100 and/or from aerial vehicle 104 may be controlled in a way that the area of areal cell coverage provided by eNB 100 remains almost the same size regardless of the height 106 of aerial vehicle 104. Accordingly, the same deployment philosophy for mobility management may be applied regardless of height of aerial vehicle 104. This may allow eNBs to be geometrically deployed so that efficient mobility can be performed.

In order to allow for a dynamic control of the areal cell coverage provided by the eNB, an aerial vehicle 104 may report its altitude (height) to eNB 100. For example, aerial vehicle 104 can report a value of altitude measured via GPS (Global Positioning System) or a height measured via pressure sensor to eNB 100. The eNB may have a database storing a relation between areal cell coverage and the coordination of eNB position. For example, the site information database stores the cell ID, eNB coordination, cell radius, Transmission Power, antenna configuration, and so on. This information is originally for terrestrial cell coverage, but it could be useful for areal carrier. When an eNB receives the position of an aerial vehicle, the eNB calculates the cell coverage area according to the information in the database. Then, the eNB checks whether the aerial vehicle is within the calculated cell coverage area or not. Alternatively, the UE may receive a subset of that database in a neighbor area of its current position from the network in advance. For example, the site database may accommodate all eNBs information. It may be too large to store in the UE. The site database picks up the information of nearest eNB from the current aerial vehicle position and its neighbor eNBs of the nearest eNB, which is called here a "neighbor area". The eNB may send the selected eNBs information from the data base to aerial vehicle. The aerial vehicle may calculate the cell coverage of a nearest eNB and its neighbor eNBs as well. This may be the calculated cell coverage, also called "zone".

Dynamic "Areal Cell Coverage" by Tracking

Figure 2:
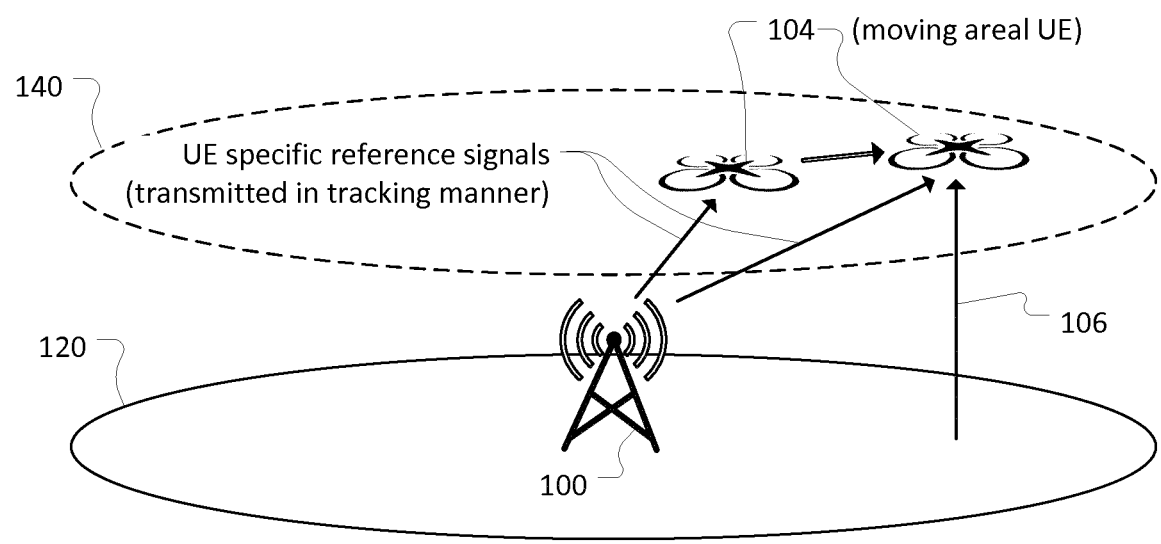
FIG. 2 describes an embodiment in which an areal cell coverage is provided in a tracking manner.

FIG. 2 describes an embodiment in which an areal cell coverage is provided in a tracking manner in relation to a mobility of an aerial UE. Although eNB 100 transmits periodic reference signal such as CRS for terrestrial UEs, eNB 100 does not transmit any periodic reference signal for aerial UEs 104 in static manner. Instead, eNB 100 transmits any signals for control and communication in a tracking manner to moving aerial UE 104, e.g. using beam-forming techniques. This may allow eNB 100 to provide to aerial UEs a "areal cell coverage" 140 that has a similar size as the cell coverage 120 for terrestrial UEs. However, as the areal cell coverage 140 for aerial UEs, eNB 100 does not provide a static coverage like the cell coverage for terrestrial UEs. Optionally, the areal cell coverage could be wider (or smaller) than the cell coverage 120 for terrestrial UEs if necessary. For example, some eNB may not support advanced beamforming functions like 3D-beamforming/ FD-MIMO/multi-antennas or might have no capacity to accommodate the aerial UEs due to high aerial UE traffic load. Even an eNB could logically provide a two-split cell coverage with beamforming. An aerial UE might require smaller zones along its course for air traffic control compared to the cell coverage of terrestrial UEs. This is an example of dynamical coverage benefits.

Neighbouring "Areal Cell Coverage"

Regardless of the specific mobility scenario applied (e.g. DL or UL mobility as explained below in more detail), neighbouring eNBs may start establishing neighbouring "areal cell coverage" depending on the location of the aerial UEs over the "areal cell coverage" provided by the serving eNB. Here, location of the aerial UEs may for example include latitude, longitude and altitude and the speed measured via GPS, or path loss/link quality/channel condition between the aerial vehicles and the serving eNB measured via DL or UL reference signals. An eNB may store a variable of last reported position of the aerial UE and optionally may predict its next position.

DownLink Mobility

In downlink-based mobility, a UE may receive reference signals (e.g., measurement reference signals (MRS) from an eNB and report measurements to the eNB. The indication of the preferred beam and/or transmission point may be included in an uplink signal (e.g. in an UL control signal or in an uplink reference signal) from the UE based on a measurement result of the reference signals from the eNB. Mobility decisions (e.g., for a handover command) at the eNB can be based on a report of measurement of the reference signals from eNB and/or based on the indication in the uplink signal of the preferred beam and/or transmission point. The eNB can also use the indication of the preferred beam for beamforming downlink signals to the UE.

Figure 3:
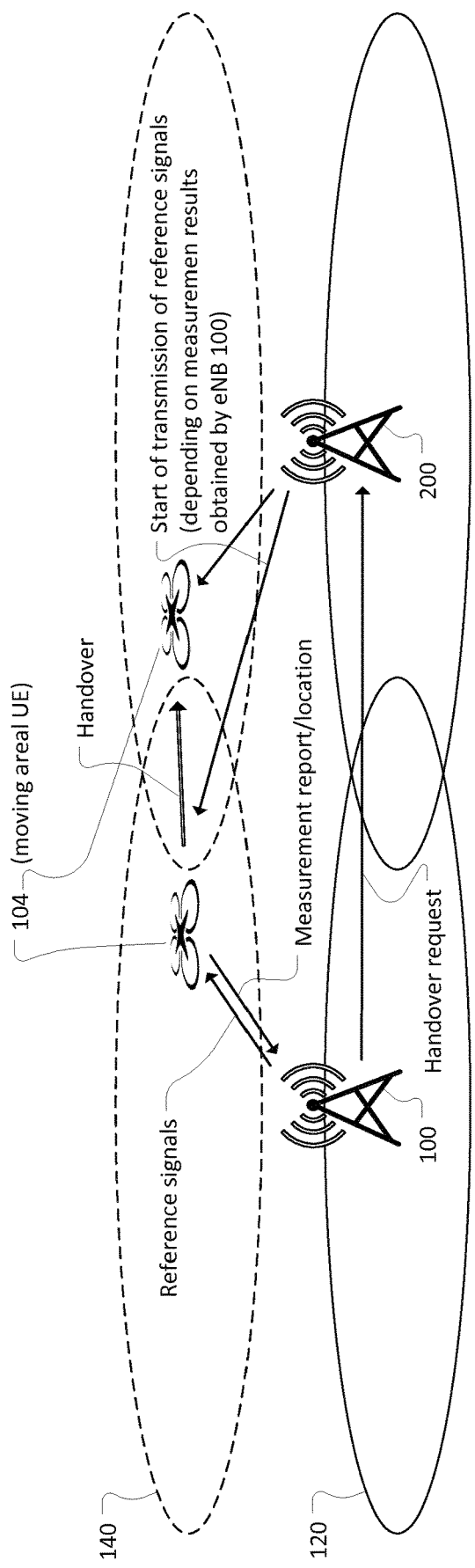
FIG. 3 shows an example of neighbouring areal cell coverage in a DL-based mobility case.

FIG. 3 shows an example of neighbouring "areal cell coverage" in a DL-based mobility case. A network can monitor a link quality/channel condition between the aerial UE 104 and the serving eNB 100 over "areal cell coverage" by means of reporting measurement/location from the aerial UE 104 and instruct a neighbouring eNB 200 to start transmitting reference signals with beam-forming by multiple antennas depending on the link quality/channel condition. In accordance with this instruction of a neighbouring eNB 200 by the network, the serving eNB 100 can update the configuration of measurement reporting from the aerial UE 104 so as to include the measurements of neighbouring eNB 200 as well as the measurements of serving eNB 100. This update of the configuration may be performed via an RRC (Radio Resource Control) message. The serving eNB 100 will judge whether handover to neighbouring eNB 200 is necessary or not, based on measurements including measurements of neighbouring eNB 200 reported from aerial UE 104. In the case that the serving eNB 100 judges that handover is necessary, the serving eNB 100 will send a Handover Request to neighbouring eNB 200 as a target eNB and trigger handover procedure (e.g. X2 Based handover procedure). An exemplifying description of the Intra-MME/ Serving Gateway Handover in LTE which provides more details about the handover procedure is provided with regard to FIG. 10 below. Alternatively, a UE may calculate the zone based on information from the subset of database in the UE. When the UE crosses the zone, the UE may send a measurement event to the eNB to activate the handover procedure.

Figure 4:
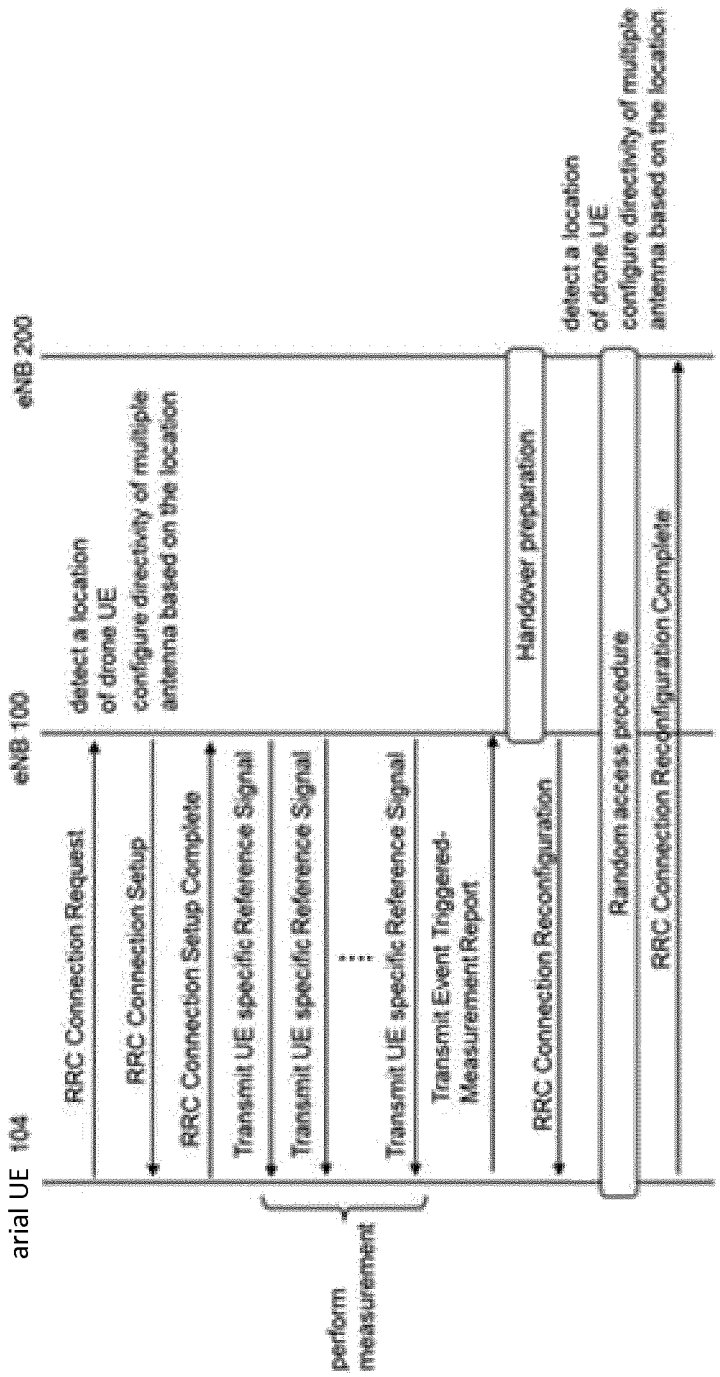
FIG. 4 describes an embodiment of a message flow in a DL (DownLink) mobility case.

FIG. 4 describes an embodiment of a message flow in a DL (DownLink) mobility case. According to this embodiment, an aerial UE 104 sends an RRC Connection Request to eNB 100. This RRC Connection Request triggers eNB 100 to send RRC Connection Setup and to start transmitting some reference signals using limited resource blocks (RBs) formed by beam-forming technology such as FD MIMO (Full Dimension MIMO) or the like, taking into account efficient radio resource usage.

In FIG. 4, the eNB which transmits the RRC Connection Setup and the reference signals is identical to the eNB which received the RRC Connection Request from aerial UE 104. However, the RRC Connection Request from the aerial UE 104 may not always be received by a nearest eNB (as referred to in R2-1705427). Accordingly, the network may manage the nearest eNB as a serving cell. For this purpose the RRC Connection Request from aerial UE 104 can include location information including height or altitude of aerial UE 104. The eNB which receives the RRC Connection Request from aerial UE 104 may pass this location information on to the network, so that the network may manage the nearest eNB as the serving cell.

The (serving) eNB can transmit the reference signals with beam-forming by multiple antennas to the extent that aerial vehicles with mobility can receive the reference signals and periodicity of transmitting these reference signals may be depend on the mobility (e.g. a speed) of the respective aerial vehicle.

As indicated by the bracket in FIG. 4, eNB 100 periodically performs measurements in order to track aerial UE 104, detects mobility (e.g. a location) of aerial UE 104, and adapts the transmission of reference signals to the mobility (e.g. location) of aerial UE 104, e.g. by configuring the directivity of multiple antenna based on the location of aerial UE 104. In order to visualize this, in FIGS. 3 and 4, there are depicted multiple instances of transmission of reference signals, where each transmission represents a transmission with changed mobility (e.g. position and/or speed) of aerial UE 104.

The reference signals transmitted by eNB 100 may be UE specific and on demand manner. That is, other than with static cell coverage for terrestrial UEs, here, the eNB 100 sends the reference signals for aerial UE 104 on demand and thus does not need to always transmit the reference signals.

Furthermore, eNB 100 can provide aerial UE 104 with any system information in response to the RRC Connection Request from aerial UE 104. Here, the system information for aerial UE 104 may be distinguished from those for terrestrial UEs. The aerial UE 104 might be in connected mode upon reception of the reference signals formed by beam-forming by multiple antennas, because a feedback of measurement or reporting of location could be necessary for configuring that beam-forming to the same extent.

Possibly eDRX (enhanced DRX) can be applied to the aerial UE 104 in connected mode for the purpose of reducing power consumption. Furthermore, inactive duration of this eDRX can be configured according to the mobility of the aerial UE 104, such as a speed.

The aerial UE 104 performs event triggered reporting of measurements from the aerial UE 104 to serving eNB 100. A measurement report may also comprise information concerning the location of aerial UE 104. Based on the measurement report/location obtained from the aerial UE, the network can monitor a link quality/channel condition between the aerial UE 104 and the serving eNB 100 and start Handover preparation, if appropriate. During Handover preparation, the network may instruct a neighbouring eNB 200 to start transmitting reference signals with beam-forming by multiple antennas. During Handover preparation, in accordance with this instruction of a neighbouring eNB 200 by the network, the serving eNB 100 can update the configuration of measurement reporting from the aerial UE 104 so as to include the measurements of neighbouring eNB 200 as well as the measurements of serving eNB 100. In the case that the serving eNB 100 (or the network) judges that handover is necessary, the serving eNB 100 will send a Handover Request to neighbouring eNB 200 as a target eNB and trigger handover procedure, which results in that the aerial UE starts the Random Access Procedure with eNB 200, and if reconnection is successful, in that aerial UE 104 issues a RRC Connection Reconfiguration Complete to eNB 200.

UpLink-Based Mobility

In uplink-based mobility, an eNB may make mobility decisions based on measurements of an uplink reference signal from a UE (e.g., without sending any MRS). The eNB can also make the beam selection and/or transmission point selection.

Aerial vehicles might be in connected mode during flying operation and could transmit some sort of UL signals (e.g. reference signal) to eNBs including neighbouring cells so that the network can select a serving cell performing any DL signal transmission (i.e. any control and user plane data) with beam-forming by multiple antennas to the aerial UEs. Furthermore, a new radio system may allow the aerial UEs to transmit those UL signals in other modes than connected mode. This selection of the serving cell can be done based on a relative relationship of the received signal strength of multiple cells which can receive the UL signals from the aerial UEs. If the UL signals include location information, the network may select the serving cell based on the location information. Even if location information is included in the uplink signal, the reference signal for demodulation may be required. For example, when UL mobility is used, the UE always sends the reference signals, Otherwise, there is a risk of missing the UE location by the network. On the other hand, if UE tells the current location to eNB, the eNB is less likely to miss the UE location. As a result, UE may less frequently send the reference signal. Accordingly, the interval of reference signal transmission can be longer than in the case where the UL signals do not include location information. This may reduce the interference and UE power consumption. The serving cell may configure a setting for transmission of the UL signals from the aerial vehicles. This setting can include at least transmission power and periodicity. Furthermore, this setting may include any scheduling information about which radio resource can be used and this scheduling may be in persistent or semi-persistent manner.

Figure 5:
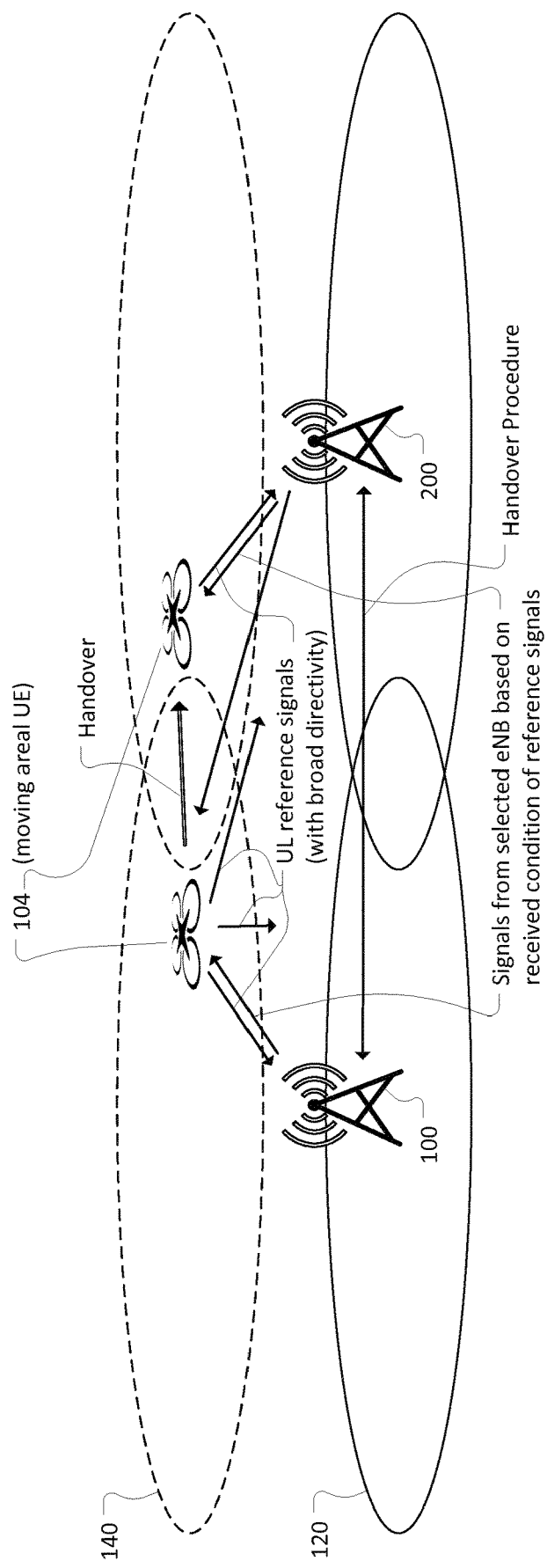
FIG. 5 describes an embodiment that is based on UL (UpLink) mobility.

FIG. 5 describes an embodiment that is based on UL (UpLink) mobility. An aerial UE 104 transmits UL reference signals according to settings configured via eNB (100 or 200) by the network. Taking into account the typical size of an aerial UE 104, this transmission of UL reference signals must not necessarily be done by beamforming, but can instead be performed with a relatively broad directivity. The serving eNB 100 can be selected among eNBs which can receive UL reference signals from aerial UE 104. This selection may be done depending on strength or/and quality of received UL reference signals. Furthermore the UL reference signals may include location information of aerial UE 104 and the serving eNB (100 in FIG. 5) may be selected based on the location information. As the aerial UE 104 moves towards a neighbouring eNB 200, the strength/quality of received UL reference signals at the eNB 200 will get better. When the strength/quality of received UL reference signals at the eNB 200 is better by a threshold (which is predetermined or configured by the network) than that at eNB 100, eNB 200 starts transmitting signals (e.g. data) to aerial UE 104, instead of eNB 100. Here, both eNBs (100 and 200) may transmit the same signals simultaneously using the same radio resources or different resources in a period. This period may be explicitly or implicitly notified by network. An example of implicit notification may be based on the strength/quality of received UL reference signals. When the strength/quality of received UL reference signals at the eNB 200 is better by a first threshold, the eNB 200 starts transmitting signals to aerial UE 104, while eNB 100 is transmitting signals to aerial UE 104 as well. When the strength/quality of the received UL reference signals at the eNB 200 is better by a second threshold, eNB 100 stops transmitting signals and only eNB 200 continues to transmit signals to aerial UE 104.

Figure 6:
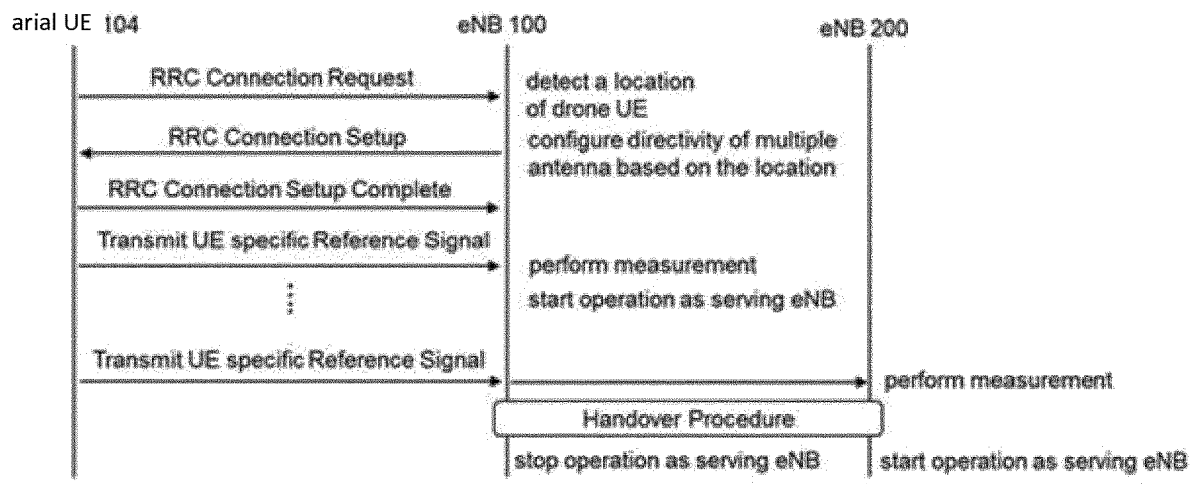
FIG. 6 describes an embodiment of a message flow in a UL (UpLink) mobility case.

FIG. 6 describes an embodiment of message flow in a UL (UpLink) mobility case. Aerial UE 104 sends an RRC Connection Request to eNB 100. eNB 100 establishes the connection to aerial UE 104 and sends RRC Connection Setup which is answered by aerial UE 104 with RRC Connection Setup Complete. In connected mode, aerial UE 104 transmits UE specific reference signals with a relatively broad directivity. These UE specific reference signals are received by eNB 100 and, once within coverage, also by neighbouring cell 200. Both, serving eNB 100 and neighbouring eNB 200 perform measurements on the UE specific UL reference signals. Based on these measurements, the network (or eNB 100) may initiate a Handover Procedure during which eNB 100 stops operation as serving eNB and eNB 200 starts operation as serving eNB.

An issue of UL mobility case could be that the directivity of the antennas of eNBs might not always be designed for receiving signals from aerial vehicles. According to R2-1705427, a neighbouring eNB could for example receive signals from a aerial UE by side lobes in a better quality than the eNB which is nearest to the aerial UE by a main lobe. In order to deploy "Areal cell coverage" for aerial vehicles above the cell coverage for terrestrial UEs, some sort of reception management with beam-forming by multiple antennas for tracking the aerial vehicles may be necessary in accordance with the timing of UL reference signal from the aerial vehicles.

Figure 7:
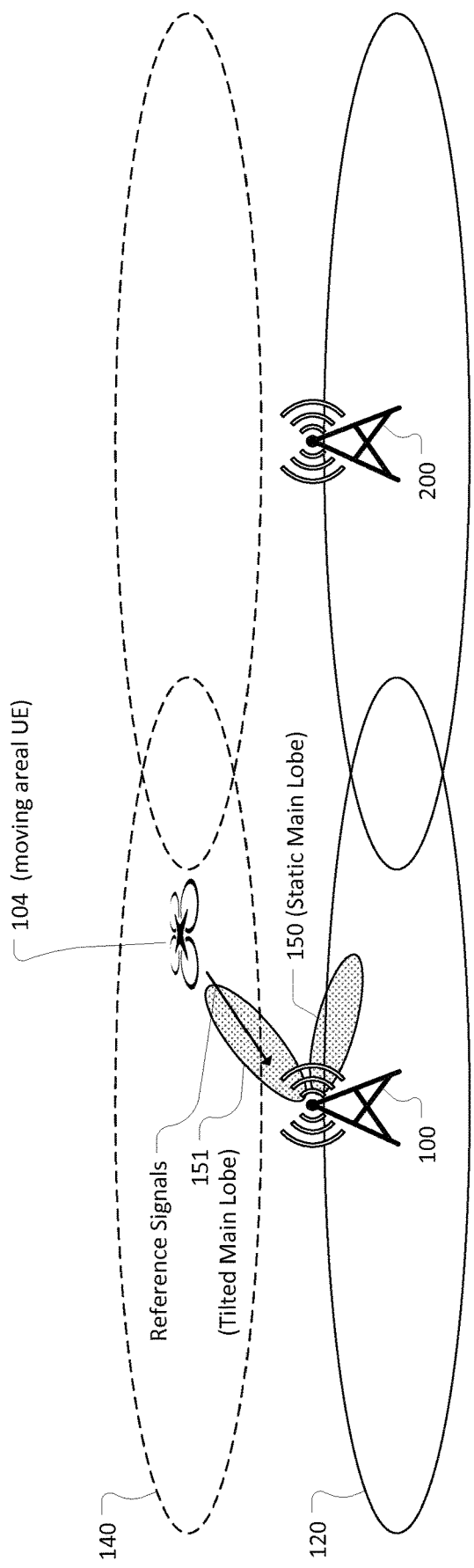
FIG. 7 shows an embodiment of reception management with beam-forming by multiple antennas for tracking aerial vehicles.

FIG. 7 shows an embodiment of reception management with beam-forming by multiple antennas for tracking aerial vehicles. In FIG. 7, a main lobe 150 is statically provided for terrestrial UEs in a conventional way. Since any radio resources for transmitting UL reference signals from aerial vehicles (such as aerial UE 104) could be allocated by the serving eNB 100, the serving eNB 100 can tilt the main lobe dynamically (151 in FIG. 7) for receiving only specific radio resources allocated for UL reference signals in a digital manner in addition to providing a static main lobe for terrestrial UEs. For example, radio resources for terrestrial UEs may tilt the main lobe in a conventional manner (i.e. statically) and radio resources for aerial vehicles may tilt the main lobe to each aerial vehicle. That is, the total radio resources in time and frequency may be be allocated to terrestrial UEs or each aerial vehicle and tilting of the main lobe can be controlled depending on which radio resources are transmitted.

Air Traffic Control

An eNB as described above may have the latest/accurate location of aerial UEs. This could be useful for air traffic control. For example, the air traffic control of aerial vehicles (e.g. an aviation authority like government may regulate it) might request the latest aerial UE location information from the mobile network. eNBs regularly update the location information to MME or to a location server of aerial UEs. MME/location server may provide this information to an external server of air traffic control. Vice versa, the external server might send the information/direction from traffic control to aerial UE via MME. This might be uncommon in terms of splitting user plane data and control plane data, but the advantage is the data via control plane could be higher priority to that via user plane. The data of air traffic control could be protected/prioritized to normal user plane data.

Implementation

Figure 8:
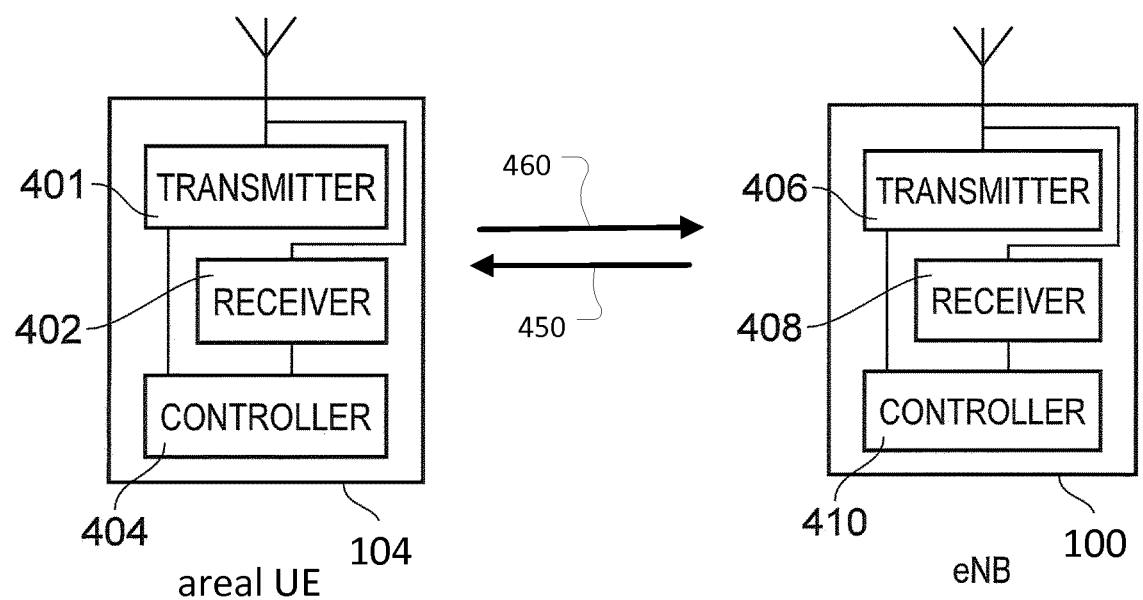
FIG. 8 shows a schematic block diagram of a communications path between an aerial UE and an eNB.

FIG. 8 shows a schematic block diagram of a communications path between an aerial UE 104 and an eNB 102. As shown in FIG. 8 the aerial UE 104 includes a transmitter 401 a receiver 402 and a controller 404 to control the transmission of signals to the eNB 100 and the reception. The up-link signals are represented by an arrow 460 which corresponds to that shown in FIG. 1 of signals from eNB 100. Downlink signals are shown by an arrow 450. The eNB 100 includes a transmitter 404 a receiver 408 and a controller 410 which may include a scheduler for scheduling the transmission and reception of signals on the downlink and the uplink in accordance with a wireless access interface.

Figure 9:
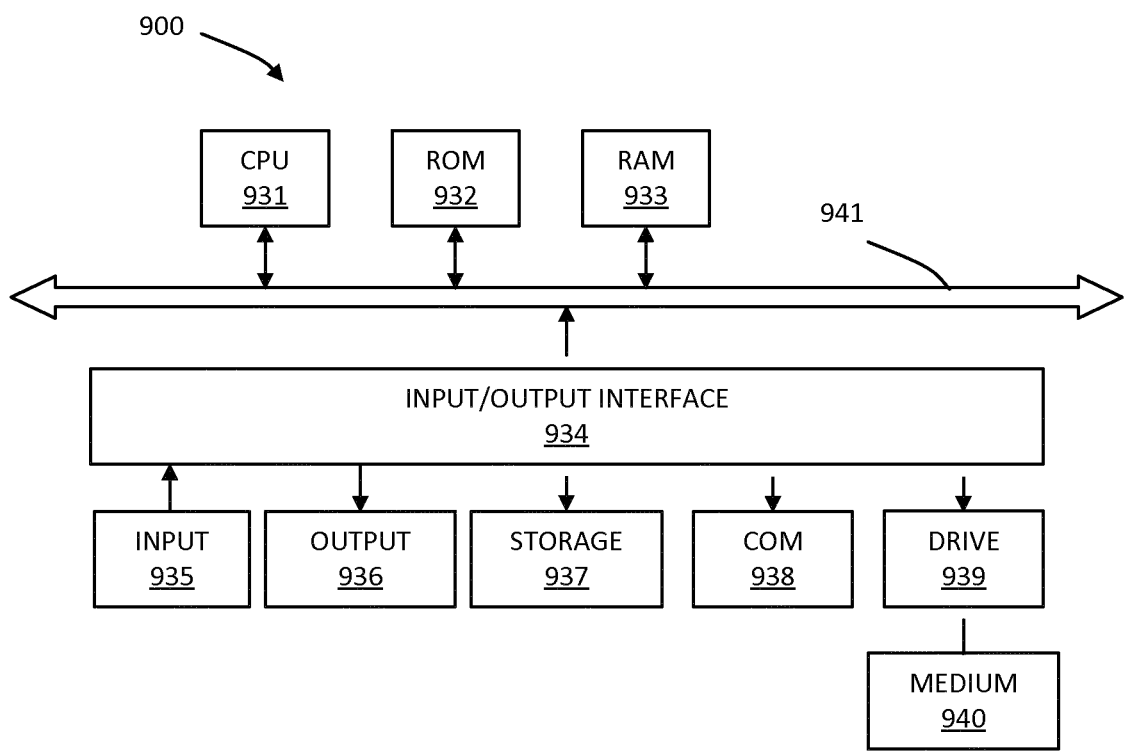
FIG. 9 shows an embodiment of a controller for a UE or for an eNB.

An embodiment of a controller 900 is described under reference of FIG. 9. This controller 900 can be implemented such that it can basically function as any type of apparatus or entity, base station or new radio base station, transmission and reception point, or user equipment as described herein. Controller 900 can thus act as controller 404 of FIG. 8 or as controller 410 of FIG. 8. The controller 900 has components 931 to 940, which can form a circuitry, such as any one of the circuitries of the entities, base stations, and user equipment, as described herein.

Embodiments which use software, firmware, programs or the like for performing the methods as described herein can be installed on controller 900, which is then configured to be suitable for the concrete embodiment.

The controller 900 has a CPU 931 (Central Processing Unit), which can execute various types of procedures and methods as described herein, for example, in accordance with programs stored in a read-only memory (ROM) 932, stored in a storage 937 and loaded into a random access memory (RAM) 933, stored on a medium 940, which can be inserted in a respective drive 939, etc.

The CPU 931, the ROM 932 and the RAM 933 are connected with a bus 941, which in turn is connected to an input/output interface 934. The number of CPUs, memories and storages is only exemplary, and the skilled person will appreciate that the controller 900 can be adapted and configured accordingly for meeting specific requirements which arise when it functions as a base station, and user equipment.

At the input/output interface 934, several components are connected: an input 935, an output 936, the storage 937, a communication interface 938 and the drive 939, into which a medium 940 (compact disc, digital video disc, compact flash memory, or the like) can be inserted.

The input 935 can be a pointer device (mouse, graphic table, or the like), a keyboard, a microphone, a camera, a touchscreen, etc. The output 936 can have a display (liquid crystal display, cathode ray tube display, light emittance diode display, etc.), loudspeakers, etc. The storage 937 can have a hard disk, a solid state drive and the like.

The communication interface 938 can be adapted to communicate, for example, via a local area network (LAN), wireless local area network (WLAN), mobile telecommunications system (GSM, UMTS, LTE, etc.), Bluetooth, infrared, etc. When the controller 900 functions as a base station, the communication interface 938 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). Moreover, the controller 900 may have one or more antennas and/or an antenna array. The present disclosure is not limited to any particularities of such protocols.

Intra-MME/Serving Gateway Handover

Figure 10:
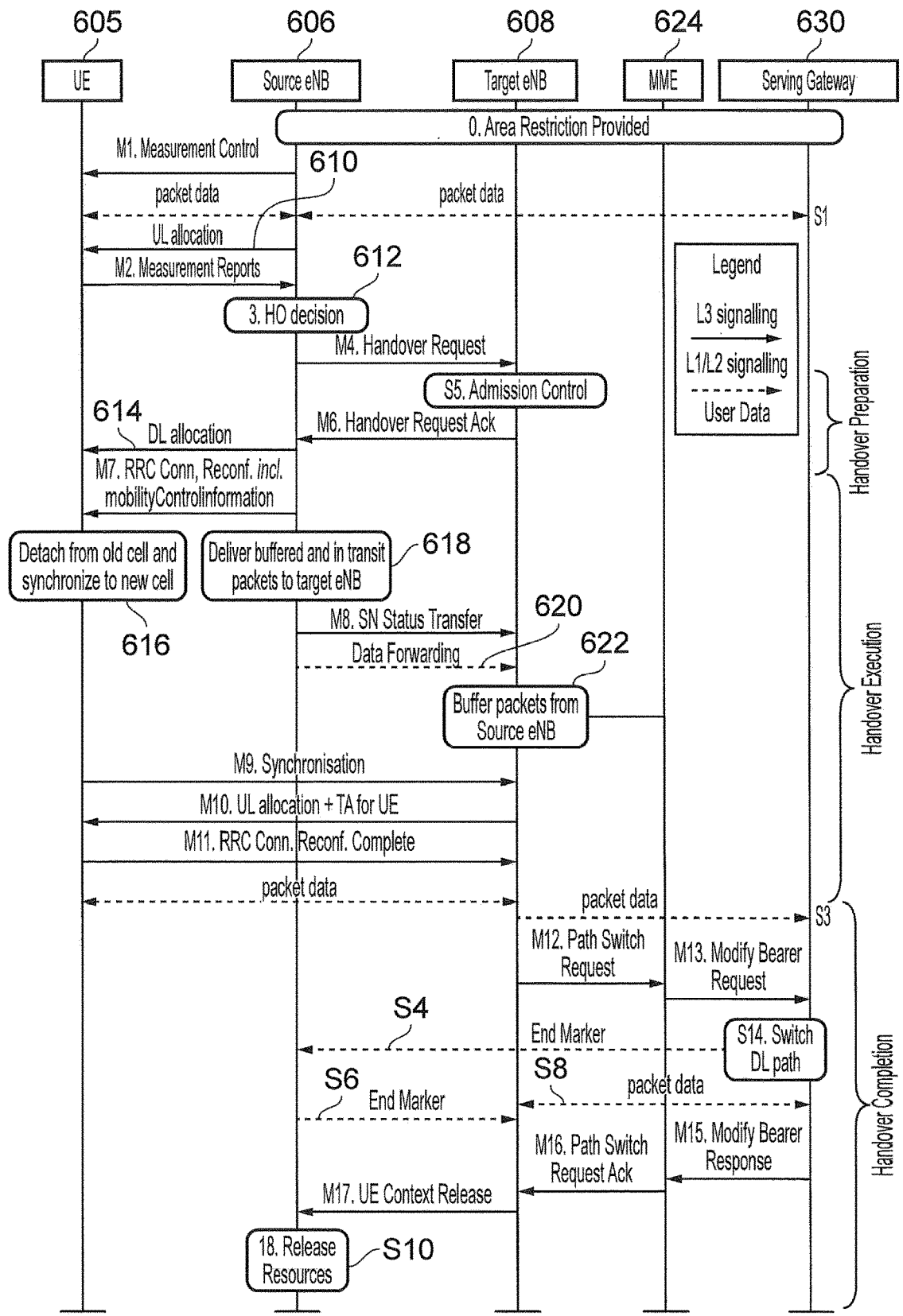
FIG. 10 presents a message flow diagram of a current handover procedure for LTE.

In order to provide a better appreciation of example embodiments of the present technique a brief description of a conventional handover technique by a UE from a source eNB 606 to a target eNB 608 is provided in the following paragraphs with reference to FIG. 10. FIG. 10 presents a message flow diagram of a current handover procedure for LTE between eNBs 606, 608. As shown in FIG. 10 a UE 605 first receives a measurement control message M1 and then performs packet data transmissions to and from the UE 605 shown by an operation S1. In an uplink allocation message the source eNB 606 transmits an allocation of resources to the UE 605. The UE 605 after performing measurements transmits a measurement report message to the source eNB 606. In a process step 612 the UE determines whether or not to handover to a target base station in this case the target eNB 608. The source eNB 606 then transmits a handover request message in a message M4 and the target eNB 608 performs an admission control step S5. The target eNB 608 transmits a handover request acknowledgement M6 to the source eNB 606 which then transmits a downlink allocation message 614 to the UE 605. An RRC collection re-confirmation and mobility control information is then transmitted by the source eNB 606 to the UE 605 in preparation former handover in a message M7. In steps 616, 618 and the UE 605 detaches from the old cell and synchronises with the new cell and buffers data for transmission via the target eNB. In the message M8 the source eNB 606 transmits a status transfer and follows by data forwarding in a transmission step 620. The target eNB 608 then buffers packets from the source eNB 608 for the downlink transmission 622 under instruction from the MME 624. The UE then transmits a synchronisation message M9 and receives an uplink allocation of resources the message M10 which is acknowledged by an RRC connection confirmation repeat message M11. In process steps S3 the eNB transmits data packets to and from the target eNB to the serving gateway. The target eNB 608 then transmits a path switch request to the MME 624 which transmits a modified bearer request to the serving gateway 630 in a message M13. In a step S14 the serving gateway then switches the downlink path which is transmitted to the source eNB 601 in a message S4. The source eNB then transmits an end marker message to the target eNB 602 in a step S6 and the data packets are transmitted from the target eNB to the serving gateway S8. The serving gateway 630 then transmits a modifying bearer request message M15 to the MME 624 which then transmits a path switch request acknowledgement message M16 to the target eNB 608 and the target eNB 608 transmits a UE context release message M17 to the source eNB 606. The source eNB 606 then performs a release resources process in step S10.

The methods as described herein are also implemented in some embodiments as a computer program causing a computer and/or a processor and/or a circuitry to perform the method, when being carried out on the computer and/or processor and/or circuitry. In some embodiments, also a non-transitory computer-readable recording medium is provided that stores therein a computer program product, which, when executed by a processor/circuitry, such as the processor/circuitry described above, causes the methods described herein to be performed.

It should be recognized that the embodiments describe methods with an exemplary ordering of method steps. The specific ordering of method steps is, however, given for illustrative purposes only and should not be construed as binding.

It should also be noted that the division of the control or circuitry of FIG. 9 into units 931 to 940 is only made for illustration purposes and that the present disclosure is not limited to any specific division of functions in specific units. For instance, at least parts of the circuitry could be implemented by a respective programmed processor, field programmable gate array (FPGA), dedicated circuits, and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below:

(1) An infrastructure equipment comprising circuitry configured to provide a terrestrial cell coverage to a terrestrial UE and an aerial cell coverage to an aerial UE, the aerial cell coverage being provided in a tracking manner in relation to a mobility of the aerial UE.

(2) The infrastructure equipment of (1), wherein the circuitry is configured to receive a connection request, the connection request comprising information identifying the sender of the connection request as an aerial UE.

(3) The infrastructure equipment according to (1) or (2), wherein a connection request received from the aerial UE triggers the circuitry to transmit reference signals by beam-forming technology to the aerial UE.

(4) The infrastructure equipment according to anyone of (1) to (3), wherein the circuitry is configured to transmit reference signals by beam-forming technology to the aerial UE in a UE specific or in an on demand manner.

(5) The infrastructure equipment of anyone of (1) to (4), wherein the circuitry is configured to define the directivity of multiple antenna based on a location of the aerial UE.

(6) The infrastructure equipment according to anyone of (1) to (5), wherein the circuitry is configured to define the aerial cell coverage depending on an area of the terrestrial cell coverage.

(7) The infrastructure equipment according to anyone of (1) to (6), wherein a connection request received from the aerial UE includes mobility information related to the aerial UE.

(8) The infrastructure equipment according to anyone of (1) to (7), wherein the circuitry is configured to establish neighbouring aerial cell coverage depending on mobility information related to the aerial UE.

(9) The infrastructure equipment according to anyone of (1) to (8), wherein the circuitry is configured to determine a speed of the aerial UE, and to switch to a neighbouring aerial cell coverage depending on the speed of the aerial UE.

(10) The infrastructure equipment according to anyone of (1) to (9), wherein the circuitry is configured to receive a measurement report from the aerial UE.

(11) The infrastructure equipment according to anyone of (1) to (10), wherein the circuitry is configured to start transmitting reference signals with beam-forming depending on a link quality/channel condition between the aerial UE and a serving eNB.

(12) The infrastructure equipment according to according to anyone of (10) to (11), wherein the measurement report includes measurement results of neighbouring eNBs reported from the areal UE.

(13) The infrastructure equipment according to anyone of (1) to (12), wherein the circuitry is configured to judge whether handover to a neighbouring eNB is necessary or not, based on a measurement report received from the aerial UE.

(14) The infrastructure equipment according to anyone of (1) to (5), wherein the circuitry is configured to use the same radio resources for transmitting data to the aerial UE as the previous serving base station when starting to act as target eNB.

(15) The infrastructure equipment according to anyone of (1) to (14), wherein the circuitry is configured to be selected as a serving cell based on a relative relationship of received signal strength of multiple cells which can receive the UL signals from the aerial vehicle.

(16) The infrastructure equipment according to (15), wherein the UL signals include mobility information and wherein the serving cell is further selected based on the mobility information.

(17) The infrastructure equipment according to (15), wherein the circuitry is configured to configure a setting for transmission of the UL signals at the aerial vehicle.

(18) The infrastructure equipment according to (15), wherein the circuitry us configured to tilt a main lobe dynamically for receiving specific radio resources allocated for the UL reference signals from the aerial UE.

(19) An electronic device comprising circuitry, wherein the circuitry is configured to be provided with an aerial cell coverage by an eNB in a tracking manner in relation to a mobility of the electronic device.

(20) The electronic device of (19), wherein the circuitry is configured to determine if the electronic device operates as a terrestrial UE or as an aerial UE.

(21) The electronic device according to (19) or (20), wherein the circuitry is configured to transmit a connection request, the connection request identifying the sender of the connection request as an aerial UE.

(22) The electronic device according to anyone of (19) to (21), wherein the circuitry is configured to transmit mobility information related to an aerial UE to an eNB.

(23) The electronic device according to anyone of (19) to (22), wherein the circuitry is configured to transmit a connection request, the connection request being configured to trigger an eNB to transmit reference signals in an on-demand manner.

(24) The electronic device according to anyone of (19) to (23), wherein the circuitry is configured to transmit a connection request, the connection request being configured to trigger an eNB to transmit reference signals to an aerial UE by beam-forming technology.

(25) The electronic device according to anyone of (19) to (24), wherein the circuitry is configured to perform reporting of measurements to a serving eNB.

(26) The electronic device according to (25), wherein a measurement report comprises information concerning the location of an aerial UE.

(27) The electronic device according to (25) or (26), wherein the measurement report includes measurements with respect to at least one neighbouring eNB.

(28) The electronic device according to anyone of (19) to (27), wherein the circuitry is configured to transmit UL reference signals to one or more eNBs for enabling a selection of a serving eNB among eNBs which can receive the UL reference signals.

(29) The electronic device according to anyone of (19) to (28), wherein the circuitry is configured to transmit UL reference signals to one or more eNBs, the UL reference signals including location information of an aerial vehicle.

(30) The electronic device according to (29), wherein the circuitry is configured to receive a configuration of output power from a serving eNB corresponding to the reported location information.

(31) The electronic device according to anyone of (19) to (30), wherein the circuitry is configured to transmit control signals and data to a serving eNB with the output power configured by the eNB.

(32) A method comprising providing a terrestrial cell coverage to a terrestrial UE and an aerial cell coverage to an aerial UE, the aerial cell coverage being provided in a tracking manner in relation to a mobility of the aerial UE.

(33) The method of (32) further comprising receiving a connection request, the connection request comprising information identifying the sender of the connection request as an aerial UE.

(34) The method of (32) or (33), wherein a connection request received from the aerial UE triggers the circuitry to transmit reference signals by beam-forming technology to the aerial UE.

(35) The method of anyone of (32) to (34) further comprising transmitting reference signals by beam-forming technology to the aerial UE in a UE specific or in an on demand manner.

(36) The method of anyone of (32) to (35) further comprising defining the directivity of multiple antenna based on a location of the aerial UE.

(37) The method of anyone of (32) to (36) further comprising defining the aerial cell coverage depending on an area of the terrestrial cell coverage.

(38) The method of anyone of (32) to (37), wherein a connection request received from the aerial UE includes mobility information related to the aerial UE.

(39) The method of anyone of (32) to (38) further comprising establishing neighbouring aerial cell coverage depending on mobility information related to the aerial UE.

(40) The method of anyone of (32) to (39) further comprising determining a speed of the aerial UE, and to switch to a neighbouring aerial cell coverage depending on the speed of the aerial UE.

(41) The method of anyone of (32) to (40) further comprising receiving a measurement report from the aerial UE.

(42) The method of anyone of (32) to (41) further comprising starting to transmit reference signals with beam-forming depending on a link quality/channel condition between the aerial UE and a serving eNB.

(43) The method of (41), wherein the measurement report includes measurement results of neighbouring eNBs reported from the areal UE.

(44) The method of anyone of (32) to (43) further comprising judging whether handover to a neighbouring eNB is necessary or not, based on a measurement report received from the aerial UE.

(45) The method of anyone of (32) to (44) further comprising using the same radio resources for transmitting data to the aerial UE as the previous serving base station when starting to act as target eNB.

(46) The method of anyone of (32) to (45) further comprising selecting an eNB as a serving cell based on a relative relationship of received signal strength of multiple cells which can receive the UL signals from the aerial vehicle.

(47) The method of (46), wherein the UL signals include mobility information and wherein the serving cell is further selected based on the mobility information.

(48) The method of anyone of (46) to (47) further comprising configuring a setting for transmission of the UL signals at the aerial vehicle.

(49) The method of anyone of (32) to (48) further comprising tilting a main lobe dynamically for receiving specific radio resources allocated for the UL reference signals from the aerial UE.

(50) A method comprising being provided with an aerial cell coverage by an eNB in a tracking manner in relation to a mobility of an electronic device.

(51) The method of (50) further comprising determining if the electronic device operates as a terrestrial UE or as an aerial UE.

(52) The method of (50) or (51) further comprising transmitting a connection request, the connection request identifying the sender of the connection request as an aerial UE.

(53) The method of anyone of (50) to (52) further comprising transmitting mobility information related to an aerial UE to an eNB.

(54) The method of anyone of (50) to (53) further comprising transmitting a connection request, the connection request being configured to trigger an eNB to transmit reference signals in an on-demand manner.

(55) The method of anyone of (50) to (54) further comprising transmitting a connection request, the connection request being configured to trigger an eNB to transmit reference signals to an aerial UE by beam-forming technology.

(56) The method of anyone of (50) to (55) further comprising performing reporting of measurements to a serving eNB.

(57) The method of anyone of (50) to (56) further comprising, wherein a measurement report comprises information concerning the location of an aerial UE.

(58) The method of (56) or (57), wherein the measurement report includes measurements with respect to at least one neighbouring eNB.

(59) The method of anyone of (50) to (58) further comprising transmitting UL reference signals to one or more eNBs for enabling a selection of a serving eNB among eNBs which can receive the UL reference signals.

(60) The method of anyone of (50) to (59) further comprising transmitting UL reference signals to one or more eNBs, the UL reference signals including location information of an aerial vehicle.

(61) The method of (60) further comprising receiving a configuration of output power from a serving eNB corresponding to the reported location information.

(62) The method of anyone of (50) to (61) further comprising transmitting control signals and data to a serving eNB with the output power configured by the eNB.

(63) A computer program causing a computer and/or a processor and/or a circuitry to perform the methods of (32) to (62), when being carried out on the computer and/or processor and/or circuitry.

(64) A non-transitory computer-readable recording medium storing a computer program product causing a computer and/or a processor and/or a circuitry to perform the methods of (32) to (62), when being carried out on a computer and/or processor and/or circuitry.

REFERENCES

[1] 3GPP TSG-RAN WG2 Meeting #98, R2-1704321, Hangzhou, China, 15-19 May 2017: "Potential mobility issues for air-borne UEs", Nokia, Alcatel-Lucent Shanghai Bell

[2] 3GPP TSG-RAN WG2 Meeting #98, R2-1704155, Hangzhou, China, 15-19 May 2017: "Handover results for aerial vehicles", Qualcomm Incorporated

[3] 3GPP TSG RAN WG2 Meeting #98, R2-1704333, Hangzhou, China, 15-19 May 2017: "Initial views on potential problems and solutions for aerial vehicles", NTT DOCOMO, INC.

[4] 3GPP TSG-RAN WG2 Meeting #98, R2-1705427, Hangzhou, China, 15-19 May 2017: "Potential enhancements for HO", Ericsson

The invention claimed is:

1. An infrastructure equipment, comprising:
circuitry configured to
provide a terrestrial cell coverage to a terrestrial UE and an aerial cell coverage to an aerial UE, the aerial cell coverage being provided in a tracking manner in relation to a mobility of the aerial UE,
define a beam-forming directivity based on weights being set for multiple antenna, wherein the aerial cell coverage is configured spatially based on the directivity of the multiple antenna,
receive a connection request from the aerial UE, and
in response to the request from the aerial UE, transmit reference signals by beam-forming technology to the aerial UE in a UE specific and an on-demand manner.

2. The infrastructure equipment of claim 1, wherein the circuitry is configured to receive a connection request, the connection request comprising information identifying the sender of the connection request as an aerial UE.

3. The infrastructure equipment according to claim 1, wherein a connection request received from the aerial UE triggers the circuitry to transmit reference signals by beam-forming technology to the aerial UE.

4. The infrastructure equipment of claim 1, wherein the circuitry is configured to define a directivity of multiple antenna based on a location of the aerial UE.

5. The infrastructure equipment of claim 1, wherein the circuitry is configured to define the aerial cell coverage depending on an area of the terrestrial cell coverage.

6. The infrastructure equipment according to claim 1, wherein a connection request received from the aerial UE includes mobility information related to the aerial UE.

7. The infrastructure equipment of claim 1, wherein the circuitry is configured to establish neighboring aerial cell coverage depending on mobility information related to the aerial UE.

8. The infrastructure equipment according to claim 1, wherein the circuitry is configured to determine a speed of the aerial UE, and to switch to a neighboring aerial cell coverage depending on the speed of the aerial UE.

9. The infrastructure equipment according to claim 1, wherein the circuitry is configured to receive a measurement report from the aerial UE.

10. The infrastructure equipment of claim 1, wherein the circuitry is configured to start transmitting reference signals with beam-forming depending on a link quality/channel condition between the aerial UE and a serving eNB.

11. The infrastructure equipment according to claim 9, wherein the measurement report includes measurement results of neighboring eNBs reported from the aerial UE.

12. The infrastructure equipment according to claim 1, wherein the circuitry is configured to judge whether handover to a neighboring eNB is necessary or not, based on a measurement report received from the aerial UE.

13. An electronic device, comprising:
circuitry, wherein the circuitry is configured to be provided with an aerial cell coverage by an eNB in a tracking manner in relation to a mobility of the electronic device,
wherein the circuitry is further configured to
receive reference signals transmitted by beam-forming, wherein the beam-forming directivity is based on weights being set for multiple antenna, wherein the aerial cell coverage is configured spatially based on the directivity of the multiple antenna,
transmit a connection request, the connection request being configured to trigger an eNB to transmit reference signals by beam-forming technology in a user equipment (UE) specific and an on-demand manner.

14. The electronic device of claim 13, wherein the circuitry is configured to determine if the electronic device operates as a terrestrial UE or as an aerial UE.

15. The electronic device according to claim 13, wherein the circuitry is configured to transmit a connection request, the connection request identifying the sender of the connection request as an aerial UE.

16. The electronic device according to claim 13, wherein the circuitry is configured to transmit mobility information related to an aerial UE to an eNB.

17. The electronic device according to claim 13, wherein the circuitry is configured to report measurements to a serving eNB.

18. A method, comprising:
providing a terrestrial cell coverage to a terrestrial UE and an aerial cell coverage to an aerial UE, the aerial cell coverage being provided in a tracking manner in relation to a mobility of the aerial UE;
defining a beam-forming directivity based on weights being set for multiple antenna, wherein the aerial cell coverage is configured spatially based on the directivity of the multiple antenna;
receiving a connection request from the aerial UE; and
in response to the request from the aerial UE, transmitting reference signals by beam-forming technology to the aerial UE in a UE specific and an on-demand manner.

* * * * *